United States Patent [19]
Watson

[11] Patent Number: 5,991,750
[45] Date of Patent: Nov. 23, 1999

[54] SYSTEM AND METHOD FOR PRE-AUTHORIZATION OF INDIVIDUAL ACCOUNT TRANSACTIONS

[75] Inventor: Craig Watson, Sandy, Utah

[73] Assignee: GE Capital, Utah

[21] Appl. No.: 08/957,419

[22] Filed: Oct. 24, 1997

[51] Int. Cl.[6] ............................. G06K 5/00; G06F 15/30
[52] U.S. Cl. ................................ 705/44; 705/2; 705/38
[58] Field of Search ........................ 705/2, 38, 44

[56] References Cited

U.S. PATENT DOCUMENTS

| | | | |
|---|---|---|---|
| 3,719,927 | 3/1973 | Michels et al. | 340/825.33 |
| 4,491,725 | 1/1985 | Pritchard | 705/2 |
| 4,594,663 | 6/1986 | Nagata et al. | 705/17 |
| 4,734,564 | 3/1988 | Boston et al. | 235/380 |
| 4,812,628 | 3/1989 | Boston et al. | 235/380 |
| 4,891,503 | 1/1990 | Jewell | 235/380 |
| 4,916,611 | 4/1990 | Doyle, Jr. et al. | 705/2 |
| 5,036,461 | 7/1991 | Elliott et al. | 364/408 |
| 5,070,452 | 12/1991 | Doyle, Jr. et al. | 705/2 |
| 5,301,105 | 4/1994 | Cummings, Jr. | 705/2 |
| 5,621,201 | 4/1997 | Langhans et al. | 235/380 |
| 5,649,116 | 7/1997 | McCoy et al. | 705/38 |
| 5,710,887 | 1/1998 | Chelliah et al. | 395/226 |
| 5,715,403 | 2/1998 | Stefik | 395/244 |
| 5,748,908 | 5/1998 | Yu | 705/44 |
| 5,757,917 | 5/1998 | Rose et al. | 380/25 |
| 5,758,327 | 5/1998 | Gardner et al. | 705/26 |
| 5,790,677 | 8/1998 | Fox et al. | 380/24 |
| 5,797,133 | 8/1998 | Jones et al. | 705/38 |
| 5,826,245 | 10/1998 | Sandberg-Diment | 705/44 |
| 5,832,447 | 11/1998 | Rieker et al. | 705/2 |

FOREIGN PATENT DOCUMENTS

| | | | |
|---|---|---|---|
| 0072183 | 2/1983 | European Pat. Off. | G06F 15/30 |

*Primary Examiner*—Allen R. MacDonald
*Assistant Examiner*—James W. Myhre
*Attorney, Agent, or Firm*—Workman, Nydegger & Seeley

[57] ABSTRACT

An account processing method and system for providing specific pre-authorization parameters for categories of transactions that would otherwise be completely denied authorization using only general authorization parameters. Upon establishment of an account, certain categories of transactions are specified as needing specific authorization prior to approving the transaction as requested by a merchant. An account issuer provides a service to account members that permits an account manager to independently specify the parametric conditions under which to approve a transaction within such categories. The account manager may also specify a transaction identifier such as a purchase order, work order or insurance claim number to associate with the required transaction parameters. Upon the approval of such a transaction requiring specific authorization, the authorizing agent during the billing process forwards both the transaction-specific information such as transaction amount and merchant information with the transaction identifier as previously assigned by the account manager. Such an association of a transaction identifier facilitates accounting reconciliation of transactions funded through credit card-like payment transactions.

40 Claims, 8 Drawing Sheets

| BILLING STATEMENT | | | |
|---|---|---|---|
| ACCOUNT NUMBER ⟋504 | MERCHANT INFO ⟋506 | AMOUNT ⟋508 | TRANSACTION IDENTIFIER ⟋510 |
| 123-456-7 | BOB'S BODY SHOP | $1234.56 | CLAIM NO. 98765 |
| 765-432-1 | WIDGET CO. | $87.65 | P.O. NO. 12345 |

FIG. 5

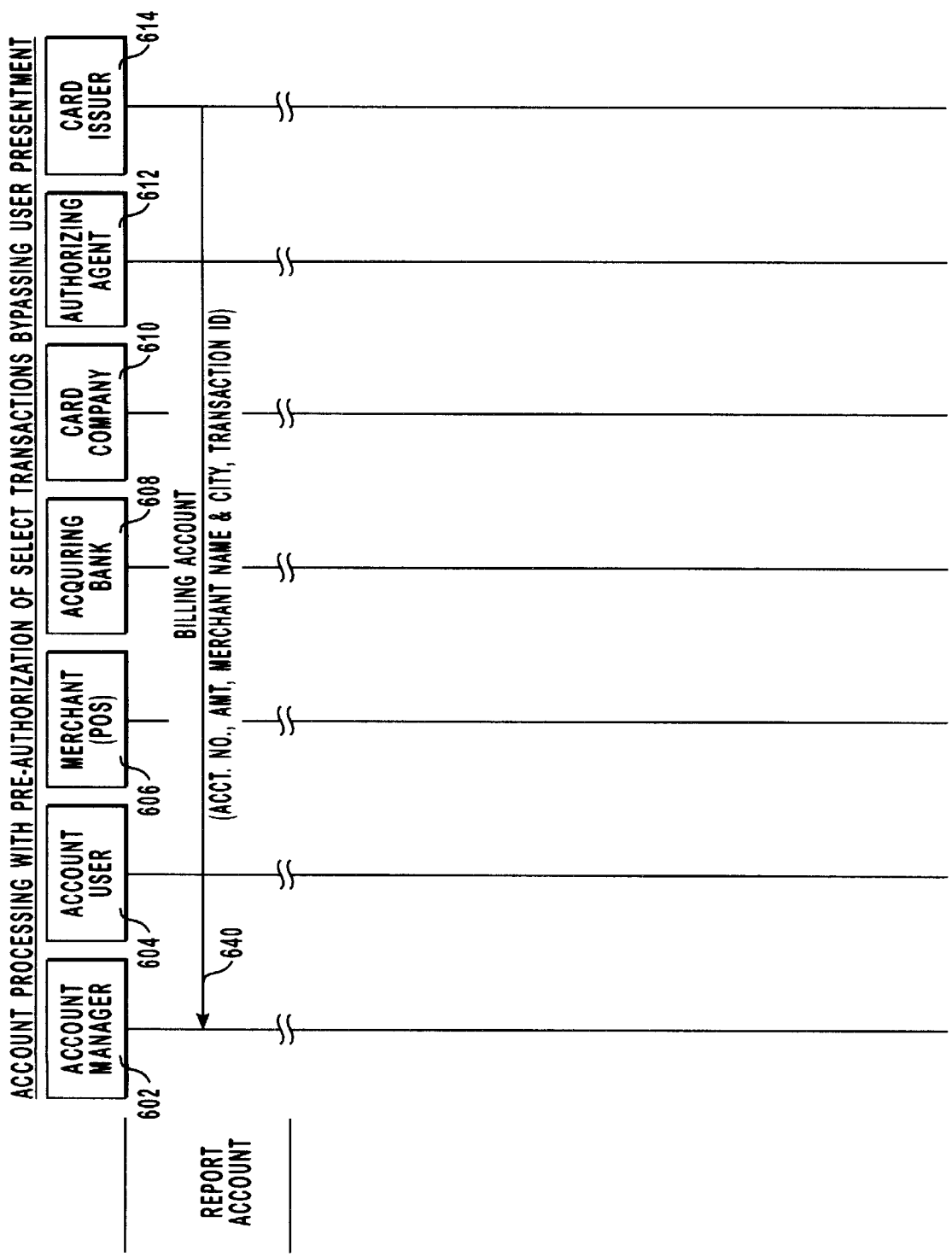

SYSTEM AND METHOD FOR PRE-AUTHORIZATION OF INDIVIDUAL ACCOUNT TRANSACTIONS

BACKGROUND OF THE INVENTION

1. The Field of the Invention

The present invention relates to electronic authorization of financial transactions, and in particular, to electronic authorization of specific predetermined transactions. More particularly, the present invention relates to specific authorization of individual transactions otherwise prohibited.

2. Present State of the Art

Modernly, more and more transactions in commerce have come to rely upon the convenience of utilizing a transaction card such as a credit card for the purchasing of goods and services. As credit cards have become more ubiquitous, so also has the infrastructure supporting the use of credit cards in commerce. At one point, what was a simple relationship between a card issuer and a cardholder has evolved to include intermediaries providing authorization services and financial distribution services. Such an expansive infrastructure has come to facilitate on-line or near real-time transaction authorization.

Furthermore, because of the extensive nature of the credit card infrastructure, additional users, not necessarily relying upon credit, also utilize the existing infrastructure in carrying out commerce. For example, businesses or corporations may establish a series of accounts with a card issuer and distribute transaction cards to their members for use in executing cashless transactions. To minimize fraud and abuse in the purchasing of goods and services, authorization standards have been established. FIG. 1 represents a standardized authorization process for transaction verification. An account manager, such as a fleet manager or other entity, desiring cashless transaction privileges contacts a card issuer 114 to request the extension of transaction privileges through an established account request 116. Typically, when establishing a credit account, card issuer 114 places restrictions such as transaction amount limitations upon the card user. However when establishing accounts for business or other like users, account manager 102 may request that card issuer 114 deny certain transactions and strictly enforce other limitations on transactions.

Exemplary desired account limitations include restrictions on the types of services and goods that may be procured by an account user 104 as directed by account manager 102. Industry standards have been established for the partitioning of goods and services into categories designated by a standard industrial code (SIC). A merchant 106 is assigned a specific standard industrial code corresponding to their predominate business function. For business transactions that adhere to the SIC coding, transactions originating at a point of sale terminal having a restricted SIC identifier may be unable to obtain proper authorization to complete a transaction with an account user. Other limitations frequently desired by account managers include transactional limits. Transactional limits may include single transaction limits or aggregate limitations upon successive transactions.

Card issuer 114 upon the establishment of an account may employ a third party authorizing agent to provide authorization services and strictly enforce transaction limitations as agreed upon between account manager 102 and card issuer 114. Card issuer 114 through an establish authorization request 118 informs authorizing agent 112 of the transaction terms under which transaction authorization may be granted.

Once an account has been established account manager 102 provides the account information necessary to enable account user 104 to engage in commerce transactions. Such account information generally includes an account number as assigned by card issuer 114. The predominate form of providing account information to account user 104 is to provide account user 104 with a transaction card generally taking the form of a credit card-like card bearing the account number thereon. Account user 104 upon initiating a transaction with a merchant 106 engages in a payment presentment step 120 by providing the requisite account information to merchant 106. Merchant 106 engages in an authorization process to verify that the transaction parameters of the present transaction are within the boundaries or limitations placed upon the account as requested by account manager 102 or imposed by card issuer 114. An authorization request 122 issued by merchant 106 is comprised of an account number, a transaction amount and other parameters such as a standard industrial code (SIC), a merchant identifier (MID) and an acquiring bank identification number (BIN).

A merchant 106 typically associates with an acquiring bank 108 which provides funding services of merchant transactions. Authorization requests may electronically pass through acquiring bank 108 as designated by the BIN of the authorization request and additionally may route through a card company 110 (e.g., MasterCard®, VISA®, Discover Card® or American Express®) prior to reaching authorizing agent 112 for comparison of account parameters. Authorizing agent 112 compares the transaction parameters for conformance with account limitations. Authorizing agent 112 issues an authorization response 124 comprising an acceptance or denial indicator.

During general authorization processing, funds generally do not transfer at that time. A settlement generally occurs at a periodic time such as evenings or nights when a merchant reinitiates communication with an authorizing agent and presents a series of accepted and authorized transactions occurring throughout the previous period and requests financial settlement of such transactions. Merchant 106 initiates a settlement request 126 with authorizing agent 112 which generally comprises the account number to be debited, the amount of the debit and other information such as SIC, MID and BIN designators. As part of the settlement process, authorizing agent 112 issues a settlement request 128 to card issuer 114. Frequently a settlement request 128 includes less cryptic merchant information (i.e., merchant name and address instead of MID) for later presentment to an account manager. Card issuer 114 in a payment step 130 credits the merchant's acquiring bank 108 with the appropriate funds.

At yet another periodic point in time, card issuer 114 provides a billing account 132 to account manager 102 for notification of payment due or for other record keeping purposes. In such generic authorization processing as described above, billing account information contains relatively little and non-descriptive information such as an account number, a transaction amount and merchant information.

Two particular shortcomings of the authorization process as described in FIG. 1 should be pointed out. First, authorization performed by authorizing agent 112 provides a regulation of transactions by either proscribing transactions originating at a merchant having a proscribed SIC goods/services designator, or withholding authorization from transactions that exceed transactional limits. Such an authorization process approves transactions of values less than the transactional limits transpiring at non-proscribed merchant point of sale terminals having a non-barred SIC goods/services designator. Prior art authorization techniques do not provide a method or system for enforcing strict transaction parameters prior to authorization of restricted transaction types on a transaction by transaction basis. Additionally, prior art techniques do not permit an account manager to create transaction authorization parameters without re-initiating account establishment procedures.

A second shortcoming of the authorization processing in the prior art relates to billing account information sent from card issuer 114 for evaluation by account manger 102. As shown in FIG. 1, the billing account information is comprised of an account number and an amount coupled to merchant information such as the name and city of the merchant. The account manager is not provided with information pertaining to a specific transaction but rather is presented only with information showing an amount and a transaction location of an expenditure. That is to say, an account manager does not have a tracking mechanism to track the execution of a specific transaction and the billing of such a transaction on a billing statement. In prior art configurations, the account manager only discerns that a certain amount of money, a transaction amount, was exchanged with a specific merchant.

Other transaction systems have incorporated item descriptions generally ascertainable from SKU numbers listing goods or services obtained from the listed merchant into their billing statements. It should be noted that such techniques still do not provide a tracking mechanism for linking a specific authorization procedure to a billing account printout.

Accordingly, what is needed is a method and system for authorizing in advance or pre-authorizing transactions that but for specific authorization, are otherwise proscribed.

What is also needed is a method and system for enforcing parameters upon such pre-authorized transactions such as transaction amounts, specific merchants and other transaction related parameters.

Also, what is yet needed, is a method and system for facilitating an audit or record reconciliation from a pre-authorized transaction through the billing of the account thus informing an account manager of the completion of a pre-authorized transaction.

SUMMARY AND OBJECTS OF THE INVENTION

It is an object of the present invention to provide a method for authorizing an account when a portion of the account transactions require individual pre-authorization according to specified pre-authorization parameters.

It is another object of the present invention to provide a system for authorizing an account when a portion of the account transactions require individual pre-authorization according to specified pre-authorization parameters.

It is a further object of the present invention to provide a method for authorizing a portion of account transactions otherwise denied by requiring individual pre-authorization according to parameters pre-authorized in a pre-authorization process.

It is yet another object of the present invention to provide a method and system for associating a transaction identifier within a pre-authorization process such that upon the completion of the transaction, the associated transaction identifier follows the transaction information through the billing account phase, thus allowing reconciliation of a specific transaction from a previously assigned transaction identifier.

Additional objects and advantages of the invention will be set forth in the description which follows, and in part will be obvious from the description, or may invention may be realized and obtained by means of the instruments and combinations particularly pointed out in the appended claims.

To achieve the foregoing objects, and in accordance with the invention as embodied and broadly described herein, an account processing method and system for facilitating the general denial of categories of transactions unless they are specifically pre-authorized with specified parameters and the parameters of the requested transaction conform to those pre-authorized parameters is provided. Additionally, the present invention provides a system and method for the pre-authorization of specific transactions to be performed by an account manager via a service provided by an account issuer to their customers such as account managers and users.

A further advancement of the present invention provides a method and system for allowing an account manager to define a transaction identifier (e.g., insurance claim number, purchase order number, work order number, etc.) and attach the transaction identifier through a pre-authorization of a transaction. Upon the initiation and authorization of a requested transaction conforming to the specified pre-authorization parameters, the transaction identifier is included with the generic billing information (e.g., transaction amount, merchant information, etc.) thus allowing an account manager to reconcile their accounting from a billing account information containing the transaction having the transaction identifier associated thereto with a pre-transaction assignment of a traditional identifier such as purchase order number, work order number, or insurance claim number.

The above described system and method includes an account establishment phase of an account process wherein an account manager approaches a card issuer to establish an account in an establish account step. During the establishment of an account, limitations on transactions relating to that account are negotiated between the account manager and card issuer. Transaction limitations generally include items such as transaction limits, account balance limit, limitations on categories of goods or services as denoted by standard industrial codes (SIC) and other parameters that may be incorporated into a specific accounting scheme.

In the present invention, upon the establishment of an account or during the amending or changing of an account, transactions involving certain categories of goods or services as denoted by pre-authorization SICs denote goods or services that require individual parametric constraints upon such transactions. A card issuer employs the services of an authorizing agent for performing account authorization upon the initiation of a transaction request from a merchant. The card issuer in an establish authorization step forwards SIC limits wholly barring categories of transactions, transaction limits relating to non-pre-authorization transactions and pre-authorization SICs designating categories or goods or services requiring specific authorization according to pre-authorization parameters subsequently dispatched to authorizing agent in a pre-authorization process.

In the present invention, once an account is established with a card issuer, an account manager may perform pre-authorization of transactions with the card issuer directly. In the preferred embodiment, an account manager using a personal computer may routinely generate pre-authorization requests by transferring pre-authorization parameters to the card issuer via the INERNET.

A typical scenario wherein the present invention is practiced provides for a pre-authorization transaction phase that commences with a request by an account user for a specified good or service that requires pre-authorization prior to initiating the transaction. The account user consults with the account manager for requesting restricted goods or services. The account manager in turn contacts the merchant for negotiating or obtaining a price quotation for the requested goods or services, or optionally, the account manager arrives at a quotation amount by consulting other traditional pricing sources such as directories or catalogs.

The account manager issues a pre-authorization request to the card issuer via a personal computer. The account manager in the pre-authorization request specifies an account number for which pre-authorization transaction parameters apply. In the preferred embodiment, one or more transaction parameters including a quote amount resulting from the quotation process, an acceptable variance or deviation range from the quotation amount, a merchant identifier (MID) or an acquiring bank identification number (BIN) are dispatched to the card issuer. It should be pointed out that in the present invention, one or more of the pre-authorization parameters may be specified while others may not be specified thus permitting the spectrum of possible options for such criteria. The card issuer relays the pre-authorization parameters to the authorizing agent for storage and usage during authorization processing.

Another aspect of the present invention includes the ability to input or provide a transaction identifier for association with an authorized completed transaction. The transaction identifier, in the preferred embodiment, provides an alpha-numeric field wherein an identifier may be specified and associated with a pre-authorized transaction and upon the initiation and authorization of the requested transaction, the transaction identifier is reported in the billing account information. Such a transaction identifier enables an account manager to associate a pre-authorization of a transaction with a transaction reported in a billing account thereby allowing reconciliation of accounting entries.

The pre-authorization parameters remain within the authorizing agent until a transaction is initiated by an account user. When an account user initiates a transaction for goods or services, a merchant initiates a payment presentment for reimbursement. In the present invention, the payment presentment takes the form of presentment of a transaction card or other credit card-like credentials bearing an account number as previously assigned for use by the account user. An account user or account manager may present the account number to the merchant using means other than a transaction card.

During the authorization, the merchant forwards the account number, the transaction amount, the merchant's SIC denoting its category of goods or services, the merchant's MID and the acquiring BIN associated with the merchant. The authorizing agent performs the authorization process which includes consulting the pre-authorization table when the merchant SIC presented in the authorization request corresponds to a pre-authorization SIC presented during the establishment of the account. The authorizing agent issues an authorization response listing the acceptance or denial status resulting from the authorization process.

During the settlement of the account, generally at the end of the business day, the merchant forwards the account numbers, the transaction amounts and other pertinent and related information such as the merchant's SIC and city location relating to each of the authorized transactions for the day. In one embodiment of the present invention, the authorizing agent additionally forwards the transaction identifier as received in the pre-authorization request. In the billing account issued by the account issuer to the account manager, the billing account includes details of the account number, the transaction amount, merchant information and when present the transaction identifier. By presenting the transaction identifier to the account manager, transactions authorized in the pre-authorize transaction phase may be traced through the authorization, settlement and reporting phases of account processing. By tracing or having a designator assigned to a specific transaction, the accounting resources of the account manager may close out such transactions upon reporting the completion of the transaction.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5 is a representative billing statement containing a transaction identifier as associated with a pre-authorized transaction and subsequently forwarded to an account manager upon completion of a pre-authorized transaction, in accordance with an embodiment of the present invention.

DETAILED DESCRIPTION OF THE PREFERRED EMBODIMENTS

As used herein, the term "account manager" refers to an individual or organization charged with establishing and monitoring an account. An account manager may be in charge of many accounts and take the form of fleet managers, accounting managers, claims adjusters and also prudent account users.

As used herein, the term "account user" refers to an individual or organization seeking goods or services and may also take the form of fleet users, business personnel and insured parties. It should be noted that an account manager and an account user may be the same party.

As used herein, the term "merchant" refers to an individual or organization providing goods or services in exchange for a fee. Merchants generally facilitate the reimbursement transaction by providing a point-of-sale terminal or other device through which a transaction is initiated.

As used herein, the term "acquiring bank" refers to a financial institution providing financial services for an associated merchant. An acquiring bank is generally a bank or like organization at which a merchant maintains an account for reconciliation of funds.

As used herein, the term "card company" refers to a sponsoring organization that provides financial services and brings organization and infrastructure into the account processing.

As used herein, the term "authorizing agent" refers to an organization which may be part of a card company and provides assurances to a merchant of the good standing of the account in question and conformity of the requested transaction to limitations and parameters placed upon a transaction.

As used herein, the term "account issuer" refers to an organization providing administrative services to an account user and a card company or authorizing agent. Account issuer may also provide augmented services to an account user or manager such as access to an authorizing agent for account establishment and other functions such as pre-authorization.

Figure 1:
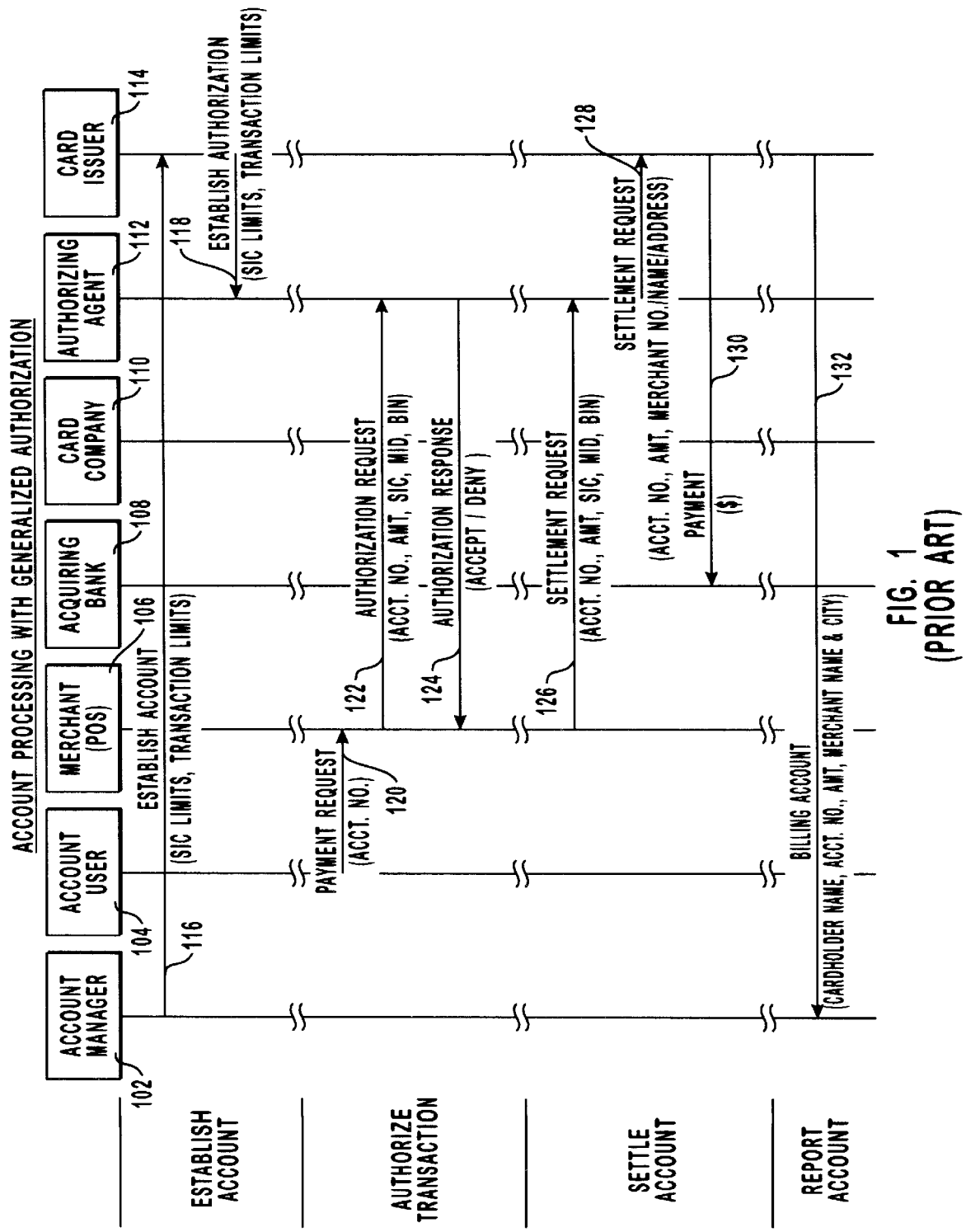
FIG. 1 is a flow diagram of an authorization process, in accordance with the prior art.

As described in the Background of the Invention, FIG. 1 is a flow diagram of an authorization process in accordance with the prior art.

Figure 2A:
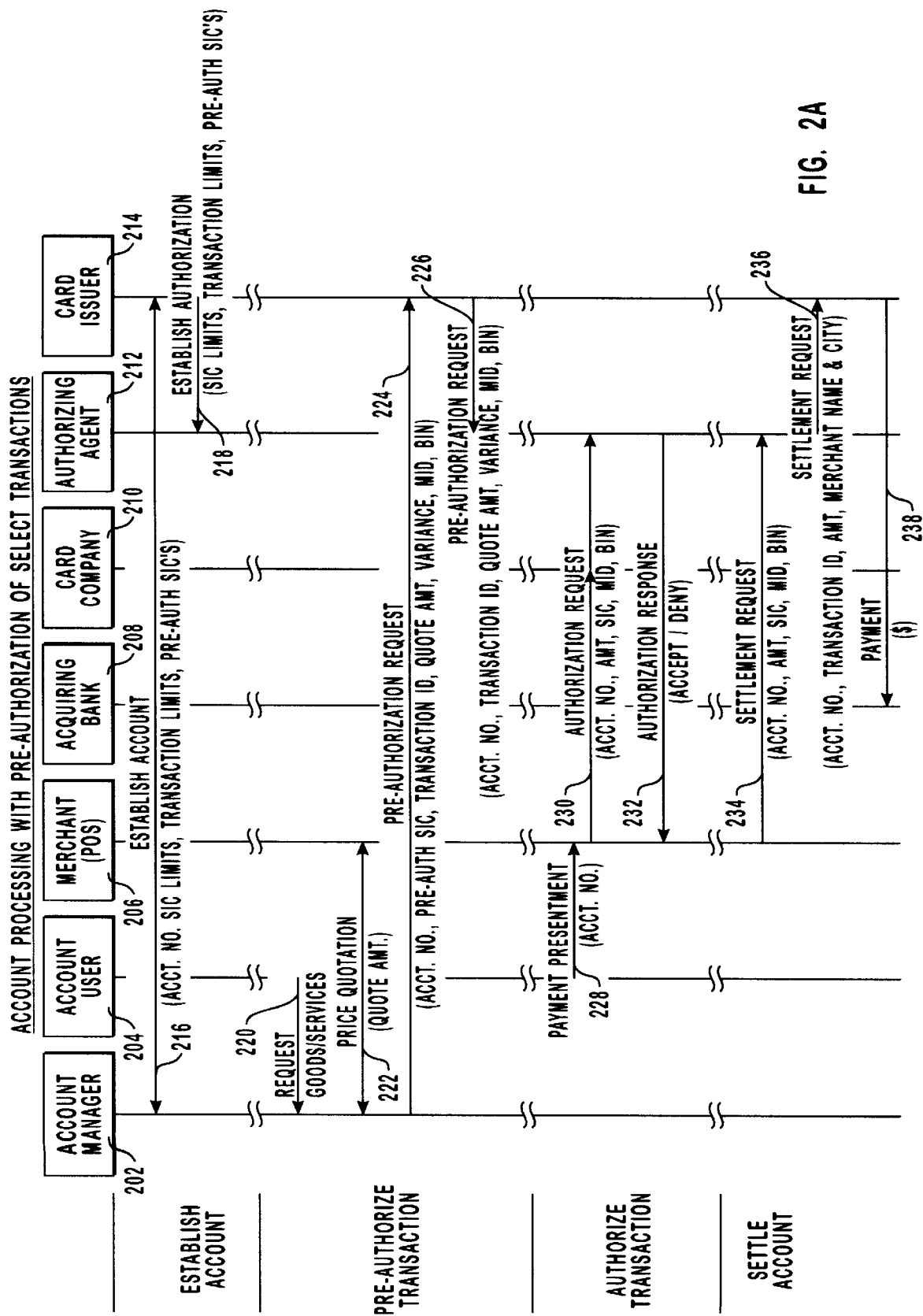
FIG. 2 is a flow diagram of a pre-authorization process, in accordance with a preferred embodiment of the present invention.
Figure 2B:
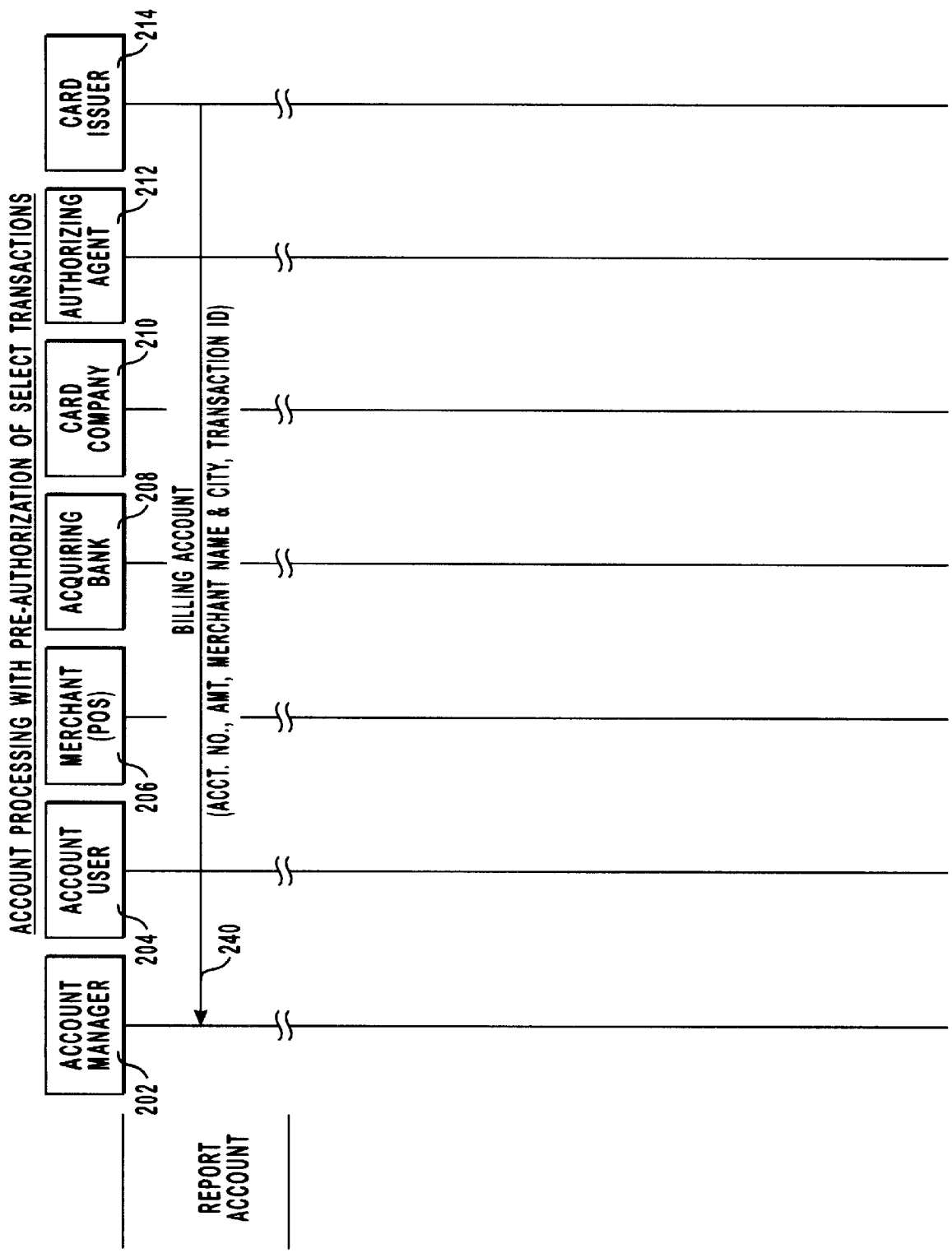

FIG. 2 is a flow diagram of account processing incorporating pre-authorization of individual transactions or transaction types, in accordance with a preferred embodiment of the present invention. As account processing has become increasingly prevalent and sophisticated, the complexities of account processing have also increased. For example, in the establishment and processing of an account, additional specified participants are incorporated into the processing flow. During an account establishment phase of an account process, an account manager 202 approaches a card issuer 214 to establish an account as represented in FIG. 2 by establish account step 216. During the establishment of an account, limitations on transactions relating to that account are negotiated between account manager 202 and card issuer 214. Transaction limitations generally include items such as transaction limits, account balance limit, limitations on categories of goods or services as denoted by standard industrial codes (SIC) and other parameters that may be incorporated into a specific account scheme.

In the present invention, upon the establishment of an account or during the amending or changing of an account, transactions involving certain categories of goods or services as denoted by pre-authorization SICs denote goods or services that require individual parametric constraints upon such transactions. For example, account manager 202 may establish an account for use by an account user 204 for performing maintenance upon a fleet vehicle. In order to police the use of the account for limited maintenance purposes, account manager 202 designates the SIC associated with maintenance as a pre-authorization SIC requiring conformity to transaction parameters subsequently defined by account manager 202.

Card issuer 214 employs the services of an authorizing agent 212 for performing account authorization upon the initiation of a transaction request from a merchant. Card issuer 214 in establish authorization step 218 forwards SIC limits wholly barring categories of transactions, transaction limits relating to non-pre-authorization transactions and pre-authorization SICs designating categories of goods or services requiring specific authorization according to pre-authorization parameters subsequently dispatched to authorizing agent 212.

In the present invention, once an account is established with a card issuer, account manager 202 may perform pre-authorization of transactions with card issuer 214 directly. In the preferred embodiment, account manager 202 using a personal computer may routinely generate pre-authorization requests by transferring pre-authorization parameters to card issuer 214 via the INTERNET.

A pre-authorization transaction phase commences with a request 220 by an account user 204 for a specified good or service that requires pre-authorization prior to initiating the transaction. Account user 204 consults with account manager 202 to obtain restricted goods or services. Account manager 202 in turn contacts a merchant 206 for negotiating or obtaining a price quotation 222, including a quote amount for the requested goods or services. Optionally, account manager 202 may consult a price quotation directory or catalog containing price quotations for goods or services as requested by account user 204. In yet another option, account manager 202 may independently generate or approximate a quote amount for a requested goods or service for use in the pre-authorization process.

Account manager 202 issues a pre-authorization request 224 to card issuer 214, in the preferred embodiment, using a personal computer that is electronically coupled to card issuer 214. Account manager 202 in pre-authorization request 224 specifies an account number for which pre-authorization transaction parameters apply. In the preferred embodiment, one or more transaction parameters including a quote amount resulting from the quotation process, an acceptable variance, or deviation range from the quotation amount, a merchant identifier (MID) or an acquiring bank identification number (BIN) are dispatched to card issuer 214. It should be pointed out that in the present invention, one or more of the pre-authorization parameters may be specified while others may not be specified, thus permitting the spectrum of possible options for such criteria. For example, account manager 202 may specify a quote amount and a variance or deviation from the quote amount, such as in the case permitting the inclusion of sales tax with the quoted transaction amount, while leaving the merchant identifier and acquiring bank identification number unspecified, thereby permitting an account user to seek out the goods or services of any merchant for processing the requested transaction.

Another field that may be input or provided by account manager 202 is a transaction identifier field. The transaction identifier, in the preferred embodiment, provides an alpha-numeric field wherein an identifier may be associated with a pre-authorized transaction and upon the initiation and authorization of the requested transaction, the transaction identifier is reported in the billing account information. Such a transaction identifier enables an account manager to associate a pre-authorization of a transaction with a transaction reported in a billing account thereby allowing reconciliation of accounting entries.

Referring to FIG. 2, card issuer 214 employs its established relationship with authorizing agent 212 to forward a pre-authorization request 226 comprised of the account number and other transaction parameters which may optionally include a transaction identifier. Authorizing agent 212 retains and stores the pre-authorization transaction parameters in a pre-authorization table 318 (FIG. 3) for subsequent authorization when a transaction presents an SIC corresponding to one designated as a pre-authorization SIC.

The pre-authorization parameters remain within authorizing agent 212 until a transaction is initiated by an account user. Optionally, pre-authorization parameters may become stale and expire if not timely used. Account user 204 requests goods or services from merchant 206 and thereafter initiates a payment presentment 228 for reimbursement to merchant 206. In the preferred embodiment, payment presentment 228 takes the form of presentment of a transaction card or other credit card-like credentials bearing an account number as previously assigned for use by account user 204. It should be noted that the present invention does not require account user 204 to present tangible credentials bearing an account number, but also accommodates the presentment of an account number to a merchant in intangible form, such as the recitation of an account number to merchant 206 for discrete key entry by merchant 206 at the commencement of the authorization process.

In yet another embodiment as detailed in FIG. 6, account manager 202 rather than account user 204 divulges an account number for use by merchant 206 upon the rendering of goods or services. Such a process has application to businesses such as the insurance industry wherein account manager 202 may play the role of a claims adjuster disclosing an account number to merchant 206 for payment of services rendered for an insurance claim.

Merchant 206 upon receipt of the account number information verifies the status and acceptance parameters of the present account by performing an authorization request 230 with authorizing agent 212. Merchant 206 forwards the account number transaction amount, the merchant's SIC denoting its category of goods or services, the merchant's MID and the acquiring BIN associated with merchant 206. Authorizing agent 212 performs the authorization process which includes consulting the pre-authorization table when the merchant SIC presented in authorization request 230 corresponds to a pre-authorization SIC presented in establish authorization step 218. The authorization process of authorizing agent 212 is detailed in the flowchart of FIG. 4. At the conclusion of the authorization process, authorizing agent 212 issues an authorization response 232 listing the acceptance or denial status resulting from the authorization process to merchant 206.

Generally at the authorization phase of a transaction, funds do not transfer between the parties. Rather, a settle account phase generally occurs at a periodic point in time such as at the end of a business day or week. At such time, merchant 206 compiles a complete listing of authorized transactions occurring within the specified period which includes the present transaction of the previous discussion, and initiates a settlement request 234 with authorizing agent 212 by divulging the account number, the transaction amount and other pertinent and related information such as the merchant's SIC, MID and BIN.

In some financial configurations, authorizing agent 212 may also act as an account clearinghouse providing account settlements for card issuers having an established relationship with authorizing agent 212. Authorizing agent 212 issues a settlement request 236 to card issuer 214 which may contain the same or similar information as received from settlement request 234 or as shown in settlement request 236 may contain more descriptive information such as a merchant name and city as opposed to an MID. In one embodiment of the present invention, authorizing agent 212 additionally forwards the transaction identifier as received in pre-authorization request 226. Card issuer 214 issues payment 238 to acquiring bank 208 for settlement of the account resulting from the present transaction.

Card issuer 214 issues a billing account 240 to account manager 202 detailing the account number, the transaction amount, merchant information and, when present, the transaction identifier. By presenting the transaction identifier to account manager 202 transactions authorized in the pre-authorize transaction phase may be traced through the authorization, settlement and reporting phases of account processing. By tracing or having a designator assigned to a specific transaction, the accounting resources of account manager 202 may close out such transactions upon the reporting of the completion of the transaction.

Figure 3:
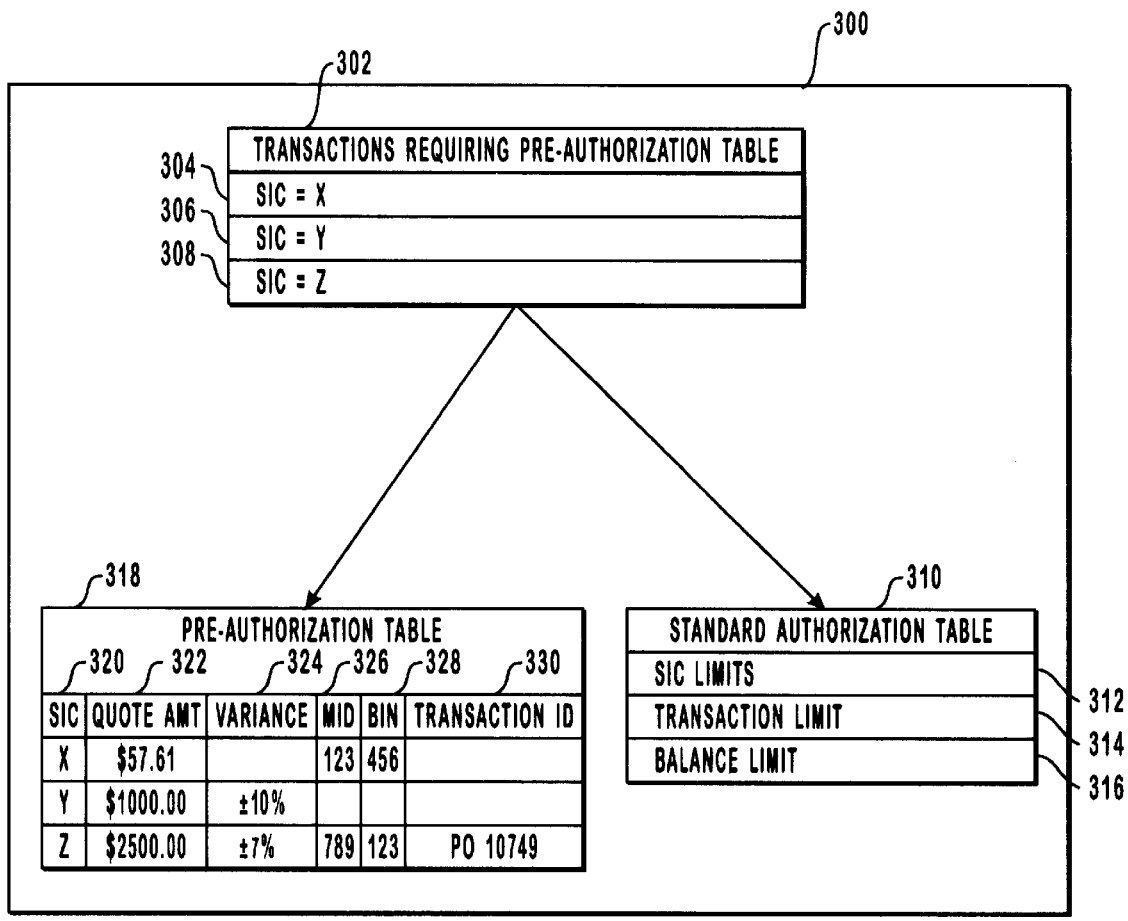
FIG. 3 is a block diagram of an authorization table including both standard and pre-authorization tables as stored within an authorizing agent, in accordance with a preferred embodiment of the present invention.

FIG. 3 is a simplified diagram of authorization tables employed by an authorizing agent for use in comparison of parameters of a requested transaction with authorization limitations placed upon transaction, in accordance with an embodiment of the present invention. An authorization agent 212 (FIG. 2) stores therein an authorization table 300 containing parameter limitations as previously designated during the establish account phase of an account processing procedure. During a traditional authorization procedure, the authorizing agent references a standard authorization table containing limitations such as an SIC limit 312, a transaction limit 314 and a balance limit 316. In the present invention specified categories of transactions may be allowed to proceed when a pre-authorization process has taken place. Such transaction categories are stored within authorization table 300 in a pre-authorization SIC table 302.

As illustrated in FIG. 3, SICs 304, 306 and 308 correspond to SIC category codes X, Y and Z, respectively, and designate transaction categories requiring consultation with a pre-authorization table 318 to determine the authorization of a requested transaction. In the preferred embodiment, pre-authorization table 318 is comprised of a series of fields designating transaction parameters that must be in compliance prior to issuing an authorization of the requested transaction. Such transaction parameters include a quote amount 322, a variance 324, a merchant ID (MID) 326 and an acquiring bank identification number (BIN) 328. Quote amount 322 is comprised of an upper price boundary for an approved transaction. A variance parameter 324 optionally provides tolerance values for accommodating variations in "amounts." For example, a variance may typically take the form of sales tax or regionalized price fluctuations or other variations. Merchant identifier 326 optionally may provide a parameter requiring the transaction to originate from a designated merchant or point of sale location. Furthermore, acquiring bank identification number 328 may optionally provide a further grouping of select merchants and employ a specified bank before authorizing the transaction in question.

In another embodiment, a transaction identifier 330 is associated with pre-authorization transaction parameters during the pre-authorization process. Such association of an identifier permits a pre-authorizing agent such as an account manager to specify a purchase order number, a work order number or an insurance claim number to be included within the pre-authorization parameters of such goods or such services. Following the initiation and authorization of a transaction wherein the pre-authorization parameters were matched, the transaction identifier is attached with the settlement request information, depicted as settlement request 236 (FIG. 2), for conveying the transaction information to a card issuer for reconveyance to the account manager. Upon receipt of the transaction identifier associated with the completed transaction, account manager 202 may rectify accounting books or other records referencing the transaction identifier because the transaction identifier was associated with the billing account and request for payment. Such a technique enables a merchant to receive payment almost immediately upon the dispatch of a settlement request and relieves the accompanying correspondence associated with "cutting" a purchase order and writing a check for accounts payable.

In an alternate embodiment of the present invention, pre-authorization table 318 further comprises an SIC identifier field 320 for associating with a specific set of pre-authorization parameters. Furthermore, each parameter within the pre-authorization table need not be specified allowing greater flexibility to an account user in selecting vendors of goods or services.

Figure 4:
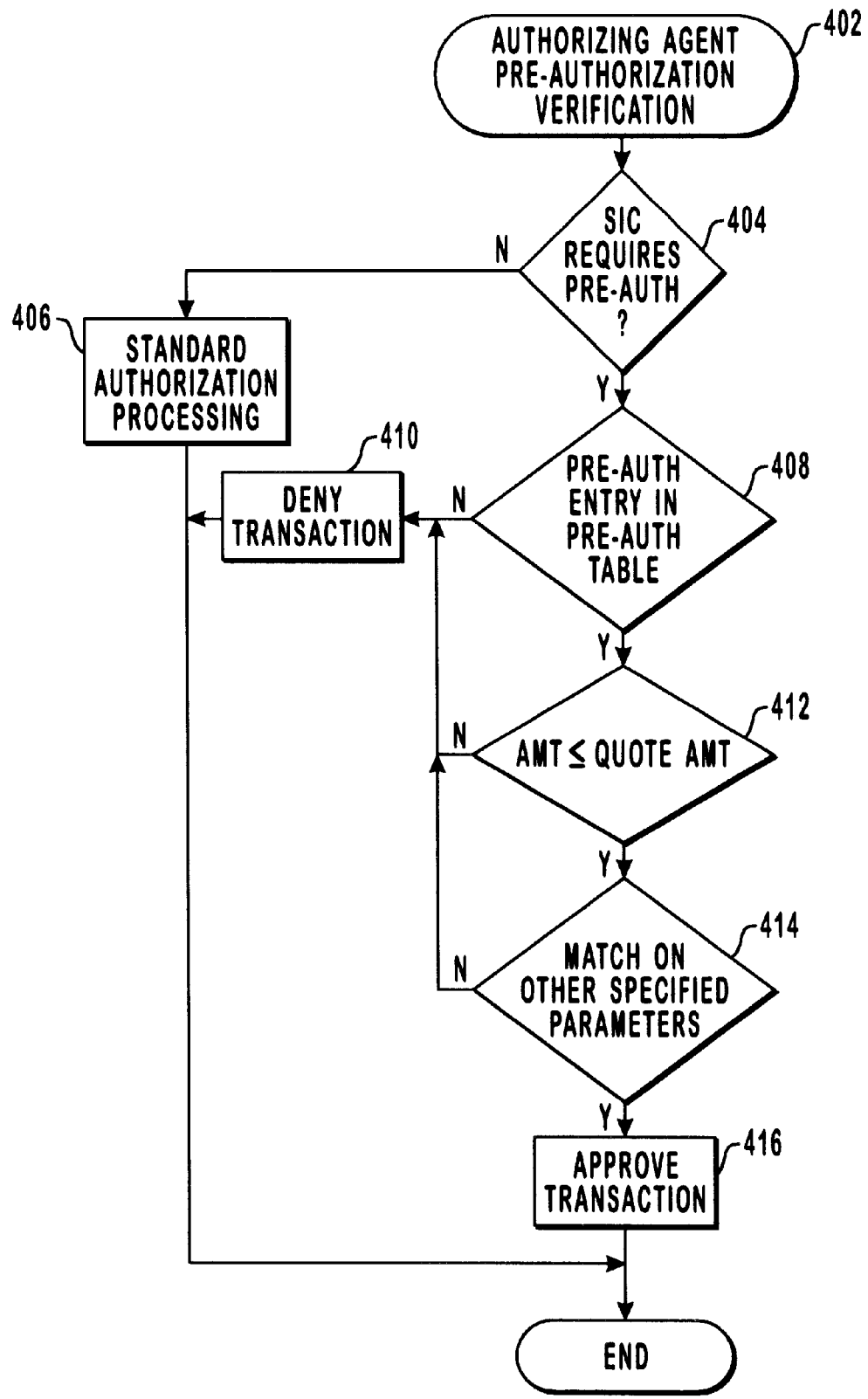
FIG. 4 is a flow chart of a transaction authorization procedure in a preauthorization-capable authorizing agent, in accordance with an embodiment of the present invention.

FIG. 4 is a flowchart of an authorization process incorporating pre-authorization, in accordance with a preferred embodiment of the present invention. An authorizing agent pre-authorization verification process 402 is carried out within an authorizing agent such as authorizing agent 212 described in FIG. 2. Although the previous discussions including FIG. 2 have illustrated entities such as authorizing agents being separate from card issuers, nothing prevents the combination of these elements into a single entity carrying out both processes therein. For example an account manager 202 (FIG. 2) and account user 204 (FIG. 2) may easily be combined into a single entity that both manages and uses an established account. Additionally, acquiring banks and card companies may further be included within other entities such as a card issuer or authorizing agent.

Authorizing agent pre-authorization verification process 402, in the preferred embodiment, is carried out by authorizing agent 212 (FIG. 2) by consulting a pre-authorization's SIC table 302 (FIG. 3) of authorization table 300. A query task 404 compares the SIC value of the requested transaction with those previously stored within the pre-authorization SIC table 302 (FIG. 3) during the establishment of the account phase. When the SIC code of the requested transaction does not match a SIC code specifically requiring additional pre-authorization, a standard authorization processing task 406 occurs wherein the standard authorization table 310 (FIG. 3) having specific limitations such as transaction or balance limits is performed.

When query task 404 determines that the SIC code of the requested transaction corresponds with a SIC code requiring pre-authorization, a query task 408 performs a cursory evaluation upon the pre-authorization table to determine if there is a pre-authorization entry present. When a pre-authorization entry is not present, a deny transaction task 410 returns a deny transaction status in the authorization response 232 (FIG. 2).

When query task 408 locates pre-authorization data within the pre-authorization table, a query task 412 evaluates the requested transaction amount against the quote amount including any variance parameters included within the pre-authorization table. When the requested transaction amount exceeds the quote amount including any variances, the requested transaction is denied as described above. When the requested transaction amount does not exceed the boundaries established by the quote amount including any variances, a query task 414 further evaluates any other specified parameters such as merchant ID (MID) or acquiring bank identification number (BIN) against those supplied by the requested transaction. Again, if the parameters of the requested transaction do not conform of those specified in the pre-authorization table, the transaction is denied.

When query task 414 determines that the parameters of the requested transaction conform to all other parameters specified in the pre-authorization table, an approved transaction task 416 authorizes the transaction in the affirmative. Although the above flow diagram has been specified in terms of task ordering, nothing precludes the evaluation of parameters or conditions in varying orders. For example, a merchant identifier specified in the pre-authorization table may be compared primary to the evaluation of the transaction amount without affecting the spirit of the invention.

FIG. 5 is a depiction of an account report associating a transaction identifier with a transaction yet to be billed, in accordance with an embodiment of the present invention. As discussed above, a transaction identifier 510 may be associated to a pre-authorized transaction generated by an account manager. Traditional billing statements presented to an account manager contain generic information such as an account number, a transaction amount and information identifying a merchant. Historically, an account manager was then left to search back through claims, work orders or purchase orders to align a transaction amount and merchant identifier contained within the billing statement to an earlier authorization.

In the present invention, a billing statement 502 is comprised of an account number 504, merchant information 506, a transaction amount 508 and a transaction identifier 510. Transaction identifier 510, by containing descriptive information unique to the transaction, enables an account manager to quickly identify a corresponding authorization document for account reconciliation. In the preferred embodiment of the present invention, transaction identifier 510 contains an alphanumeric field which is defined by account manager 202 (FIG. 202) and distributed to card issuer 214 using pre-authorization request 224, which in turn is forwarded to authorizing agent 212 and pre-authorization request 226, respectively. By allowing a transaction identifier to be associated with pre-authorization process, less sophisticated equipment such as transaction processing equipment resident at a merchant point of sale may remain relatively unsophisticated as such equipment does not process or pass through any additional parameters such as a transaction identifier.

FIG. 6 is a flow diagram illustrating account processing which employs pre-authorization of select transactions without requiring an account user to perform a payment presentment step, in accordance with an embodiment with the present invention. In the present embodiment, the established account phase proceeds according to that of the previous embodiment wherein an established account 616 and an established authorization step 618 establish an account number, SIC limitations, transaction limitations and pre-authorization SICs requiring individual pre-authorization.

An account user 604 requests goods or services of an account manager 602 in a task 620. Account manager 602 negotiates a price quotation 622 from a merchant 606. Account manager 602 either upon resolution of a price quotation from a merchant 602 or, as discussed above, account manager 602 may obtain a quote amount value for placing within a pre-authorization request from other sources such as other standard pricing materials.

In the present embodiment, account manager 602 provides merchant 606 as opposed to account user 604 with an account number in account disclosure step 224 for utilization in a subsequent authorization request initiated by merchant 606. Following the disclosure of the account number to merchant 606, account manager 602 performs a pre-authorization request 626 in accordance with the description of the previous embodiment. A pre-authorization request 628 then flows from card issuer 614 to authorizing agent 612 for population of the pre-authorization table 318 (FIG. 3). Such steps complete the pre-authorization phase of the account processing procedure.

Upon the rendering of service or delivery of goods, merchant 606 commences an authorization transaction process by issuing an authorization request 602 to authorizing agent 612 utilizing the account number delivered thereto by account manager 602 in account disclosure steps 224. Such an account number distribution technique is useful for applications such as insurance claim processing. For example, account user 604 assumes the role of an insured placing a claim against account manager 602, who further assumes the role of the insurer, or alternatively, a claims adjuster. Account manger 602 negotiates a repair price with a merchant 606 assuming the role, in the case of auto insurance, of a repair shop.

Upon completion of the negotiation process and the resolution of a claim amount, account manager 602 (i.e., claims adjuster) discloses an account number for use by merchant 606 (i.e., repair shop) for use in obtaining reimbursement for goods and services upon the completion of rendering such goods or services. Account manager 602 (i.e., claims adjuster) initiates pre-authorization request 626 by including the divulged account number, and any other parameters deemed necessary (e.g., merchant identification number). Furthermore, to aid account manager 602 (i.e., claims adjuster) in reconciling their accounting system, account manager 602 includes a transaction identifier, which by way of example may be in the form of an insurance claim number uniquely identifying the requested claim by the insured.

Upon the rendering of services or the delivery of goods, merchant 606 (i.e., repair shop) issues an authorization request 602 comprising the account number disclosed with the amount of the transaction and other identifiers flowing therewith. Authorizing agent 612 performs an authorization procedure and renders an authorization response 632 stating the status of either acceptance or denial of the requested transaction to merchant 606. Merchant 606, at a periodic interval, issues a settlement request 634 containing the account number, transaction amount and other identifying fields to authorizing agent 612 for account reconciliation. Authorizing agent 612 processes the settlement request in conjunction with card issuer 614 in a settlement request 636 including the account and transaction-related information such as account number, transaction amount, merchant number/name/address and the transaction identifier tieing the present billing line item to the originating claim number as delivered to account manger 602 in billing account step 640 as further received from settlement request step 636.

As briefly described above, the present invention provides a mechanism for utilizing existing account processing infrastructure such as existing point of sale terminals which are generally incapable of inputting additional information such as a transaction identifier into a transaction. In the present embodiment, associating a transaction identifier to a specific transaction is transparent to an account user, merchant, acquiring bank and card company. Furthermore, because of the services provided by the card issuer to the account manager, the account manager may establish, edit and delete pre-authorizations at will without exhaustive and expensive account-modifying parameters as historically required.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computerized account authorization method wherein a portion of account transactions require both individual pre-authorization and conformance with account transaction limitations, said method comprising the steps of:
    (a) establishing an account between an account manager and an account issuer, said account having an imposed pre-authorization transaction type for denoting said portion of account transactions that require said individual pre-authorization;
    (b) said account manager pre-authorizing said account upon a match of each of at least one specified transaction parameter of said imposed pre-authorization transaction type to authorize a requested transaction; and
    (c) authorizing said requested transaction when in conformity with both said at least one specified transaction parameter and said account transaction limitations.

2. The computerized account authorization method as recited in claim 1, wherein said establishing an account step comprises the step of designating a standard industrial code (SIC) as said imposed pre-authorization transaction type.

3. The computerized account authorization method as recited in claim 1, wherein said pre-authorizing step comprises the step of designating said at least one specified transaction parameter as a quotation amount describing a price boundary under which to authorize said requested transaction.

4. The computerized account authorization method as recited in claim 3, wherein said designating said at least one specified transaction parameter as a quotation amount step further comprises the step of designating a variance parameter from said quotation amount as one of said at least one specified transaction parameters.

5. The computerized account authorization method as recited in claim 1, wherein said pre-authorizing step comprises the step of designating said at least one specified transaction parameter as a merchant identifier (MID) describing a specific authorized merchant to authorize said requested transaction.

6. The computerized account authorization method as recited in claim 1, wherein said pre-authorizing step comprises the step of designating said at least one specified transaction parameter as an acquiring bank identifier number (BIN) describing a specific authorized merchant to authorize said requested transaction.

7. The computerized account authorization method as recited in claim 1, wherein said pre-authorizing step further comprises the step of associating a transaction identifier to said at least one specified transaction parameter.

8. The computerized account authorization method as recited in claim 7, further comprising the step of reporting said transaction identifier to said account manager upon authorization of said requested transaction.

9. The computerized account authorization method as recited in claim 8, wherein said associating a transaction identifier step further comprises the step of designating a claim number as said transaction identifier.

10. The computerized account authorization method as recited in claim 8, wherein said associating a transaction identifier step further comprises the step of designating a purchase order number as said transaction identifier.

11. The computerized account authorization method as recited in claim 1, wherein said authorizing said requested transaction step further comprises the step of an account user presenting an account identifier of said account to facilitate said authorizing said requested transaction step.

12. The computerized account authorization method as recited in claim 1, wherein said authorizing said requested transaction step further comprises the step of said account manager presenting an account identifier of said account to facilitate said authorizing said requested transaction step.

13. In a computerized account authorization system wherein a portion of account transactions require individual pre-authorization, a method for authorizing said portion of account transactions requiring individual pre-authorization comprising the steps of:

(a) receiving an authorization table of an account established between an account manager and an account issuer, said authorization table capable of having an imposed pre-authorization transaction type to denote said portion of account transactions that require said individual pre-authorization;

(b) receiving in a pre-authorization table within said authorization table at least one specified transaction parameter of said imposed pre-authorization transaction type whereupon a match of each of said at least one specified transaction parameter of said imposed pre-authorization transaction type to authorize a requested transaction; and (c) authorizing said requested transaction when in conformity with both each of said at least one specified transaction parameter of said imposed pre-authorization transaction type and account transaction limitations placed upon a transaction.

14. In a computerized account authorization system wherein a portion of account transactions require individual pre-authorization, the method for authorizing said portion of account transactions requiring individual pre-authorization as recited in claim 13, wherein said receiving in a pre-authorization table step comprises the step of receiving a standard industrial code (SIC) as said imposed pre-authorization transaction type.

15. In a computerized account authorization system wherein a portion of account transactions require individual pre-authorization, the method for authorizing said portion of account transactions requiring individual pre-authorization as recited in claim 13, wherein said receiving in a pre-authorization table step further comprises the step of receiving a quotation amount as said at least one specified transaction parameter describing a price boundary under which to authorize said requested transaction.

16. In a computerized account authorization system wherein a portion of account transactions require individual pre-authorization, the method for authorizing said portion of account transactions requiring individual pre-authorization as recited in claim 15, wherein said receiving a quotation amount as said at least one specified transaction parameter step further comprises the step of receiving a variance parameter designating an allowable deviation from said quotation amount as one of said at least one specified transaction parameters.

17. In a computerized account authorization system wherein a portion of account transactions require individual pre-authorization, the method for authorizing said portion of account transactions requiring individual pre-authorization as recited in claim 13, wherein said receiving in a pre-authorization table step further comprises the step of receiving said at least one specified transaction parameter as a merchant identifier (MID) describing a specific authorized merchant to authorize said requested transaction.

18. In a computerized account authorization system wherein a portion of account transactions require individual pre-authorization, the method for authorizing said portion of account transactions requiring individual pre-authorization as recited in claim 13, wherein said receiving in a pre-authorization table step further comprises the step of receiving as said at least one specified transaction parameter an acquiring bank identifier number (BIN) describing a specific authorized merchant to authorize said requested transaction.

19. In a computerized account authorization system wherein a portion of account transactions require individual pre-authorization, the method for authorizing said portion of account transactions requiring individual pre-authorization as recited in claim 13, wherein said receiving in a pre-authorization table step further comprises the step of receiving a transaction identifier to said at least one specified transaction parameter.

20. In a computerized account authorization system wherein a portion of account transactions require individual pre-authorization, the method for authorizing said portion of account transactions requiring individual pre-authorization as recited in claim 19, further comprising the step of reporting said transaction identifier to said account manager upon authorization of said requested transaction.

21. A computerized account authorization system wherein a portion of account transactions require individual pre-authorization, said system comprising:

(a) an account between an account manager and an account issuer, said account having associated therewith an authorization table to designate an imposed pre-authorization transaction type to denote said portion of account transactions that require said individual pre-authorization such that when said account transactions conform with imposed pre-authorization transaction type a pre-authorized table is consulted;

(b) said pre-authorization table comprising at least one specified transaction parameter as required to authorize a specified requested transaction of said imposed pre-authorization transaction type; and (c) means for authorizing said requested transaction when in conformity with said at least one specified transaction parameter.

22. The computerized account authorization system as recited in claim 21, wherein said imposed pre-authorization transaction type is a standard industrial code (SIC).

23. The computerized account authorization system as recited in claim 21, wherein said at least one specified transaction parameter is a quotation amount describing a price to authorize said requested transaction.

24. The computerized account authorization system as recited in claim 23, wherein said at least one specified transaction parameter further comprises a variance parameter from said quotation amount.

25. The computerized account authorization system as recited in claim 21, wherein said at least one specified transaction parameter is a merchant identifier (MID) to describe a specific authorized merchant to authorize said requested transaction.

26. The computerized account authorization system as recited in claim 21, wherein said at least one specified transaction parameter is an acquiring bank identifier number (BIN) to describe a specific authorized merchant to authorize said requested transaction.

27. The computerized account authorization system as recited in claim 21, wherein said pre-authorization table further comprises a transaction identifier to said at least one specified transaction parameter.

28. The computerized account authorization system as recited in claim 27, further comprising a means for reporting said transaction identifier to said account manager upon authorization of said requested transaction.

29. The computerized account authorization system as recited in claim 28, wherein said transaction identifier is a claim number.

30. The computerized account authorization system as recited in claim 28, wherein said transaction identifier is a purchase order number.

31. The computerized account authorization system as recited in claim 21, further comprising a means for an account user to present an account identifier of said account to facilitate said authorizing said requested transaction.

32. The computerized account authorization system as recited in claim 21, further comprising a means for said account manager to present an account identifier of said account to facilitate said authorizing said requested transaction.

33. In an account authorization system wherein a portion of account transactions require both individual pre-authorization and conformance with account transaction limitations, a computer-readable medium having computer-executable instructions for authorizing said portion of account transactions requiring individual pre-authorization for performing the steps of:

(a) receiving an authorization table of an account established between an account manager and an account issuer, said authorization table capable of having an imposed pre-authorization transaction type to denote said portion of account transactions that require said individual pre-authorization;

(b) receiving in a pre-authorization table within said authorization table at least one specified transaction parameter of said imposed pre-authorization transaction type whereupon a match of each of said at least one specified transaction parameter of said imposed pre-authorization transaction type to authorize a requested transaction; and (c) authorizing said requested transaction when in conformity with each of said at least one specified transaction parameter.

34. The computer-readable medium of claim 33 having further computer-readable instructions wherein said receiving in a pre-authorization table step comprises the step of receiving a standard industrial code (SIC) as said imposed pre-authorization transaction type.

35. The computer-readable medium of claim 33 having further computer-readable instructions wherein said receiving in a pre-authorization table step further comprises the step of receiving a quotation amount as said at least one specified transaction parameter describing a price boundary under which to authorize said requested transaction.

36. The computer-readable medium of claim 35 having further computer-readable instructions wherein said receiving a quotation amount as said at least one specified transaction parameter step further comprises the step of receiving a variance parameter designating an allowable deviation from said quotation amount as one of said at least one specified transaction parameters.

37. The computer-readable medium of claim 33 having futher computer-readable instructions wherein said receiving in a pre-authorization table step further comprises the step of receiving said at least one specified transaction parameter as a merchant identifier (MID) describing a specific authorized merchant to authorize said requested transaction.

38. The computer-readable medium of claim 33 having futher computer-readable instructions wherein said receiving in a pre-authorization table step further comprises the step of receiving as said at least one specified transaction parameter an acquiring bank identifier number (BIN) describing a specific authorized merchant to authorize said requested transaction.

39. The computer-readable medium of claim 33 having futher computer-readable instructions wherein said receiving in a pre-authorization table step further comprises the step of receiving a transaction identifier to said at least one specified transaction parameter.

40. The computer-readable medium of claim 39 having futher computer-readable instructions further comprising the step of reporting said transaction identifier to said account manager upon authorization of said requested transaction.

\* \* \* \* \*

UNITED STATES PATENT AND TRADEMARK OFFICE
CERTIFICATE OF CORRECTION

PATENT NO. : 5,991,750
DATED : November 23, 1999
INVENTOR(S) : Craig J. Watson

Figure 6A:
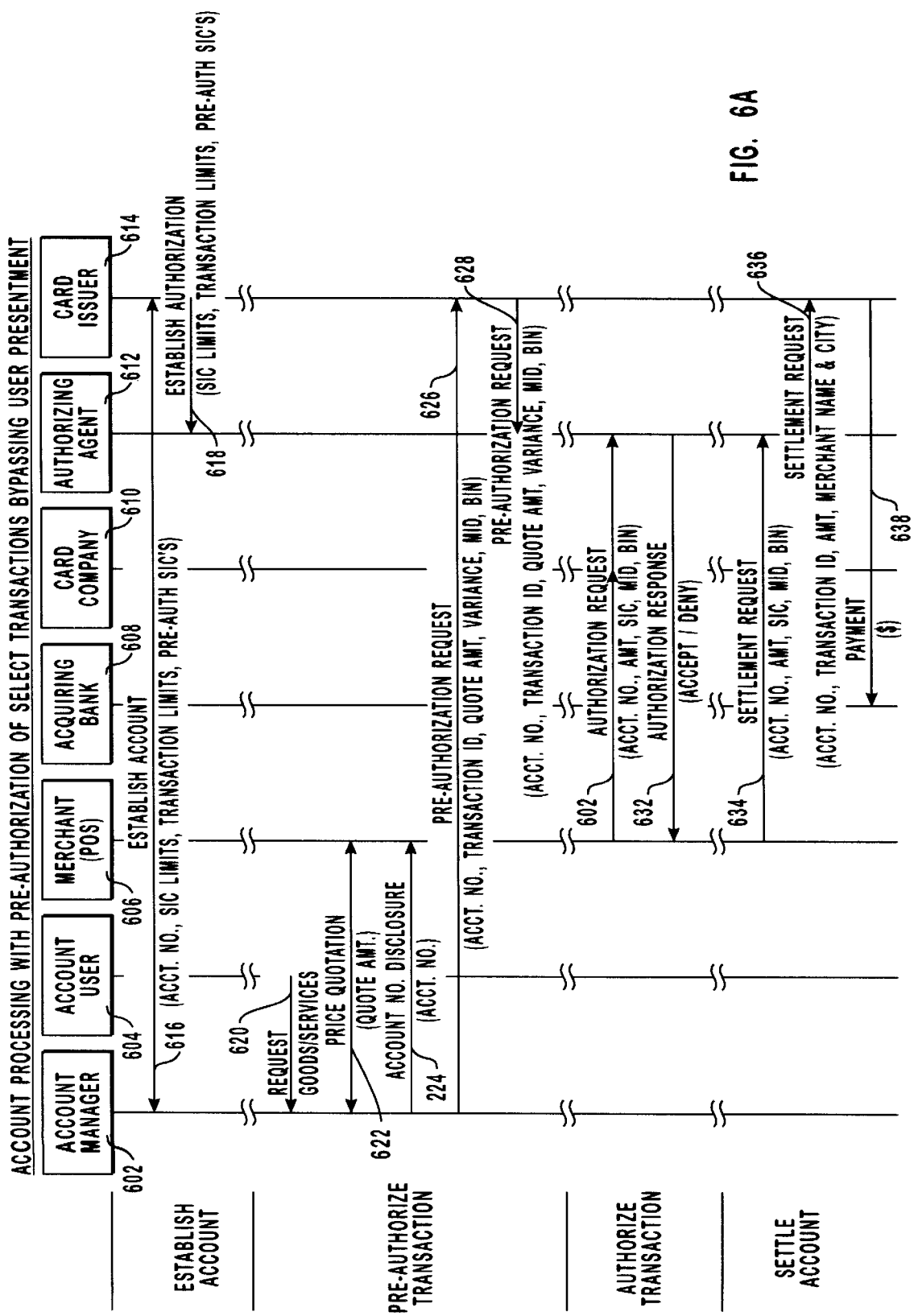
FIG. 6 is a flow diagram illustrating account processing which employs pre-authorization of select transactions without requiring an account user to perform a payment presentation step, in accordance with an embodiment of the present invention.

It is certified that error appears in the above-identified patent and that said Letters Patent is hereby corrected as shown below:

Label "602" in between labels 628 and 632 on Figure 6A is a duplicate. Please change said label "602" in between labels 628 and 632 to -- 630 --.

<u>Column 13,</u>
Line 15, please change "request 602" to -- request 630 --.
Line 43, please change "request 602" to -- request 630 --.

Signed and Sealed this

Thirteenth Day of November, 2001

Attest:

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

| | | |
|---|---|---|
| PATENT NO. | : 5,991,750 | |
| APPLICATION NO. | : 08/957419 | |
| DATED | : November 23, 1999 | |
| INVENTOR(S) | : Craig J. Watson | |

It is certified that error appears in the above-identified patent and that said Letters Patent is hereby corrected as shown below:

Please replace Claim 1, col. 14, lines 14-29 with

--Claim 1. A computerized account authorization method wherein a portion of account transactions require individual transaction pre-authorization specifying at lest one account transaction parameter for said individual transaction and conformance by a requested invidual transaction with said at least one account transaction parameter, said method comprising the steps of:

a) establishing an account between an account manager and an account issuer to allow an account user to obtain goods or services from a merchant, said account having an imposed pre-authorization transaction type for denoting said portion of account transactions that require said individual transaction pre-authorization between said account manager and said account issuer before an authorization request from said merchant;

b) said account manager with said account issuer pre-authorizing said account with said at least one account transaction parameter for said individual transaction; and c) upon said authorization request by said merchant, authorizing said requested individual transaction when said requested transaction is in conformity with said at least one specified transaction parameter. --

Please replace Claim 4, col. 14, lines 40-45 with

-- Claim 4. The computerized account authorization method as recited in claim 3, wherein said account transaction variance parameter is a percentage of said quotation amount. --

Please replace Claim 13, col. 15, lines 16-38 with

-- Claim 13. In a computerized account authorization system wherein a portion of account transactions required both individual transaction pre-authorization specifying at least one account transaction parameter for said individual transaction and conformance by a requested individual transaction with said at least one account transaction parameter, a method for authorizing said portion of account transactions requiring said individual transaction pre-authorization comprising the steps of:

UNITED STATES PATENT AND TRADEMARK OFFICE
CERTIFICATE OF CORRECTION

| | |
|---|---|
| PATENT NO. | : 5,991,750 |
| APPLICATION NO. | : 08/957419 |
| DATED | : November 23, 1999 |
| INVENTOR(S) | : Craig J. Watson |

It is certified that error appears in the above-identified patent and that said Letters Patent is hereby corrected as shown below:

Please replace Claim 13, col. 15, lines 16-38 with (cont'd)

a) receiving an authorization table of an account established between an account manager and an account issuer to allow an account user to obtain goods or services from a merchant, said authorization table capable of having an imposed pre-authorization transaction type to denote said portion of account transactions that require said individual transaction pre-authorization between said account manager and said account issuer before an authorization request from said merchant;

b) receiving in a pre-authorization table within said authorization table at least one specified transaction parameter for said individual transaction of said imposed pre-authorization transaction type; and c) authorizing said requested individual transaction when said requested individual transaction is in conformity with each of said at least one specified transaction parameter for said individual transaction of said imposed pre-authorization transaction type. --

Please replace Claim 21, col. 15, lines 32-49 with

-- Claim 21. A computerized account authorization system wherein a portion of account transactions require individual transaction pre-authorization prior to authorization request by a merchant, said method comprising the steps of:

a) an account between an account manager and an account issuer, said account having associated therewith an authorization table to designate an imposed pre-authorization transaction type for denote said portion of account transactions that require said individual transaction pre-authorization between said account manager and said account issuer before an authorization request by said merchant such that when said account transactions conform with imposed pre-authorization type a pre-authorized table is consulted;

b) said pre-authorization table comprising at lest one specified transaction parameter as required to authorize a specified requested transaction of said imposed pre-authorization transaction type; and c) means for authorizing said requested transaction when in conformity with said at least one specified transaction parameter. --

UNITED STATES PATENT AND TRADEMARK OFFICE
CERTIFICATE OF CORRECTION

| | | |
|---|---|---|
| PATENT NO. | : 5,991,750 | |
| APPLICATION NO. | : 08/957419 | |
| DATED | : November 23, 1999 | |
| INVENTOR(S) | : Craig J. Watson | |

It is certified that error appears in the above-identified patent and that said Letters Patent is hereby corrected as shown below:

Please replace Claim 24, col. 16, lines 57-59 with

-- Claim 24. The computerized account authorization system as recited in claim 23, wherein said variance parameter is a percentage of said quotation amount. --

Please replace Claim 33, cols. 17-18, lines 27-49 with

-- Claim 33. In an account authorization system wherein in a portion of account transactions required both individual transaction pre-authorization specifying at least one account transaction parameter for said individual transaction and conformance by a requested individual transaction with said at least one account transaction parameter, a computer-readable medium having computer-executable instructions for authorizing said portion of account transactions requiring said individual transaction pre-authorization for performing the steps of:

a) receiving an authorization table of an account established between an account manager and an account issuer to allow an account user to obtain goods or services from a merchant, said authorization table capable of having an imposed pre-authorization transaction type to denote said portion of account transactions that require said individual transaction pre-authorization between said account manager and said account issuer before an authorization request from said merchant;

b) receiving in a pre-authorization table within said authorization table at least one specified transaction parameter for said individual transaction of said imposed pre-authorization transaction type; and

UNITED STATES PATENT AND TRADEMARK OFFICE
CERTIFICATE OF CORRECTION

PATENT NO. : 5,991,750
APPLICATION NO. : 08/957419
DATED : November 23, 1999
INVENTOR(S) : Craig J. Watson It is certified that error appears in the above-identified patent and that said Letters Patent is hereby corrected as shown below:

Please replace Claim 33, cols. 17-18, lines 27-49 with (cont'd)

c) authorizing said requested individual transaction when said requested individual transaction is in conformity with each of said at least one specified transaction parameter. --

Signed and Sealed this

Tenth Day of July, 2007

JON W. DUDAS
*Director of the United States Patent and Trademark Office*